US009692273B2

(12) United States Patent
Sekii et al.

(10) Patent No.: US 9,692,273 B2
(45) Date of Patent: Jun. 27, 2017

(54) SPINDLE MOTOR, ELECTRONICS DEVICE AND DISK DRIVE APPARATUS

(71) Applicant: Nidec Corporation, Kyoto (JP)

(72) Inventors: Yoichi Sekii, Kyoto (JP); Kazuya Enokizono, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 401 days.

(21) Appl. No.: 14/299,137

(22) Filed: Jun. 9, 2014

(65) Prior Publication Data

US 2015/0015106 A1    Jan. 15, 2015

Related U.S. Application Data

(60) Provisional application No. 61/845,532, filed on Jul. 12, 2013.

(51) Int. Cl.
*H02K 5/16* (2006.01)
*H02K 7/08* (2006.01)
(Continued)

(52) U.S. Cl.
CPC ........... *H02K 5/165* (2013.01); *F16C 17/107* (2013.01); *F16C 33/103* (2013.01);
(Continued)

(58) Field of Classification Search
CPC .......... H02K 7/08; H02K 5/1675; H02K 7/09; H02K 5/165; H02K 5/1677;
(Continued)

(56) References Cited

U.S. PATENT DOCUMENTS 5,552,650 A    9/1996 Cap et al.
5,949,164 A    9/1999 Cap et al.
(Continued)

FOREIGN PATENT DOCUMENTS

JP    02-101389 U    8/1990
JP    04-308438 A    10/1992
JP    05-159450 A    6/1993

OTHER PUBLICATIONS

Sekii et al., "Spindle Motor and Motor Unit", U.S. Appl. No. 14/036,333, filed Sep. 25, 2013.

*Primary Examiner* — Joshua Benitez-Rosario
*Assistant Examiner* — Alexander Singh
(74) *Attorney, Agent, or Firm* — Keating & Bennett, LLP (57) ABSTRACT

A rotating portion of a spindle motor includes a rotor magnet, a circular plate portion, and an annular raised portion that projects downward from the circular plate portion. A stationary portion includes a stator, a base portion, and an annular recessed portion configured to accommodate the raised portion. The raised portion includes an inner circumferential surface and an outer circumferential surface. The inner circumferential surface is positioned radially opposite a first side surface of the recessed portion with a first minute gap intervening therebetween. The outer circumferential surface is positioned radially opposite a second side surface of the recessed portion with a second minute gap intervening therebetween. The first minute gap has an axial dimension greater than an axial dimension of a seal portion.

12 Claims, 6 Drawing Sheets

(51) Int. Cl.
*H02K 5/167* (2006.01)
*F16C 33/10* (2006.01)
*F16C 17/10* (2006.01)

(52) U.S. Cl.
CPC ......... *H02K 5/1675* (2013.01); *H02K 5/1677* (2013.01); *H02K 7/08* (2013.01); *F16C 2370/12* (2013.01); *H02K 2213/03* (2013.01)

(58) Field of Classification Search
CPC ... H02K 2213/03; F16C 17/107; F16C 33/74; F16C 2370/12; F16C 32/06; F16C 33/103; F16C 33/107; F16C 33/745
USPC .............................. 310/90; 360/98.07, 99.08
See application file for complete search history.

(56) References Cited

U.S. PATENT DOCUMENTS

| | | |
|---|---|---|
| 2005/0104464 A1 | 5/2005 | Fujii et al. |
| 2005/0135003 A1* | 6/2005 | Inoue ...................... F16C 17/10 360/99.08 |
| 2008/0107367 A1* | 5/2008 | Hirata .................. C10M 105/38 384/107 |
| 2011/0181986 A1* | 7/2011 | Kodama ............... F16C 17/107 360/224 |
| 2012/0306304 A1 | 12/2012 | Kim et al. |

* cited by examiner

SPINDLE MOTOR, ELECTRONICS DEVICE AND DISK DRIVE APPARATUS

BACKGROUND OF THE INVENTION

1. Field of the Invention

The present invention relates to a spindle motor, an electronics device including the spindle motor, and a disk drive apparatus including the spindle motor.

2. Description of the Related Art

Spindle motors arranged to rotate disks are installed in hard disk drive apparatuses and optical disk drive apparatuses. Such spindle motors include a stationary portion fixed to a housing of the apparatus, and a rotating portion arranged to rotate while supporting the disk(s). While the spindle motor is running, a torque centered on a central axis is produced between the stationary portion and the rotating portion through interaction of magnetic flux. The rotating portion is thereby able to rotate with respect to the stationary portion.

A so-called fluid dynamic bearing is often used as a bearing of the spindle motor described above. The fluid dynamic bearing includes a stationary bearing portion, a rotatable bearing portion, and a lubricating fluid. A gap between the stationary bearing portion and the rotatable bearing portion is filled with the lubricating fluid. The rotating portion is supported by this fluid dynamic bearing to be rotatable with respect to the stationary portion.

The lubricating fluid in the fluid dynamic bearing described above gradually evaporates if the fluid dynamic bearing is used for a long period of time. A decrease in the amount of the lubricating fluid in the fluid dynamic bearing may lead to an inability of the rotatable bearing portion to rotate, or may cause the rotatable bearing portion to rotate while rubbing against the stationary bearing portion.

Accordingly, a structure of the fluid dynamic bearing which reduces evaporation of the lubricating fluid is required.

SUMMARY OF THE INVENTION

A spindle motor according to a preferred embodiment of the present invention includes a stationary portion; a rotating portion configured to rotate about a central axis with respect to the stationary portion; and a bearing configured to support the rotating portion. The bearing includes a stationary bearing portion, a rotatable bearing portion, a seal portion, a lubricating fluid, and a liquid surface of the lubricating fluid. The stationary bearing portion is fixed to the stationary portion. The rotatable bearing portion is configured to rotate together with the rotating portion. The seal portion is located between a wall surface of the rotatable bearing portion and a wall surface of the stationary bearing portion. The lubricating fluid is positioned to intervene between the rotatable bearing portion and the stationary bearing portion. The liquid surface of the lubricating fluid is located in the seal portion. The rotating portion includes a rotor magnet, a circular or substantially circular plate portion, and an annular or a substantially annular raised portion. The circular or substantially circular plate portion extends around the central axis. The raised portion projects downward from the circular or substantially circular plate portion. The stationary portion includes a stator, a base portion, and an annular recessed portion. The stator is arranged opposite to the rotor magnet with a gap intervening therebetween. The base portion extends around the central axis, and is configured to have the stator fixed thereto. The recessed portion is configured to accommodate the raised portion, and includes a first side surface and a second side surface. The raised portion includes an inner circumferential surface and an outer circumferential surface. The inner circumferential surface is positioned radially opposite the first side surface of the recessed portion with a first minute gap intervening therebetween. The outer circumferential surface is positioned radially opposite the second side surface of the recessed portion with a second minute gap intervening therebetween. The first minute gap preferably has an axial dimension greater than an axial dimension of the seal portion.

According to a preferred embodiment of the present invention, the likelihood that a gas evaporated from the liquid surface of the lubricating fluid will travel out of the motor is significantly reduced or eliminated, for example. This contributes to reducing or eliminating any decrease in the amount of the lubricating fluid in the bearing.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
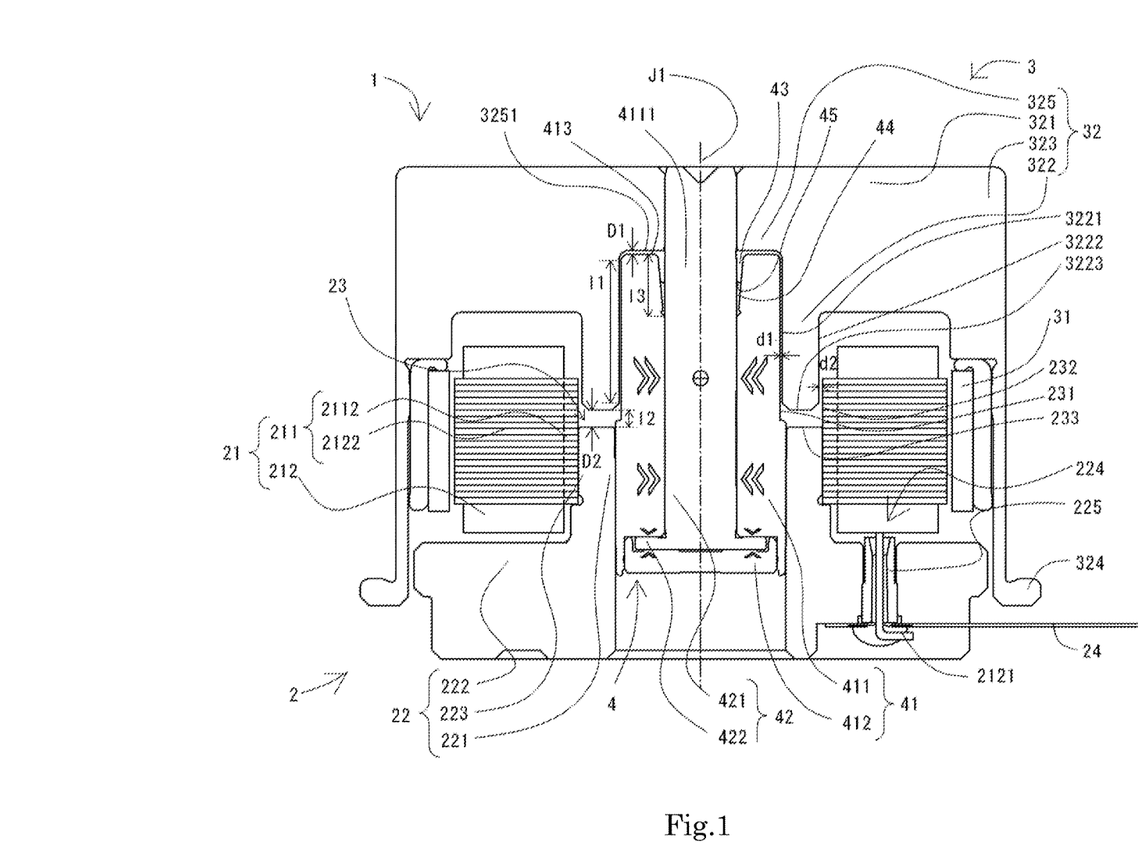
FIG. 1 is a cross-sectional view of a motor according to a preferred embodiment of the present invention.

Hereinafter, exemplary preferred embodiments of the present invention will be described with reference to the drawings. It is assumed herein that a vertical direction is defined as a direction in which a central axis of a motor extends, and that an upper side and a lower side along the central axis in FIG. 1 are referred to simply as an upper side and a lower side, respectively. It should be noted, however, that the above definitions of the vertical direction and the upper and lower sides are not meant to indicate relative positions or directions of different members or portions when they are actually installed in a device. Also note that a direction parallel or substantially parallel to the central axis is referred to by the term "axial direction", "axial", or "axially", that directions perpendicular or substantially perpendicular to the central axis are each referred to simply by the term "radial direction", "radial", or "radially", and that a circumferential direction about the central axis is referred to simply by the term "circumferential direction", "circumferential", or "circumferentially".

Also note that the terms "axial direction", "axial", and "axially" as used hereinafter refer to not only a direction exactly parallel to the central axis but also directions pointing in so nearly the same direction as the central axis that practicability of the present invention may not be impaired, that is, substantially axial directions. Also note that the terms "radial direction", "radial", and "radially" as used herein refer to not only directions exactly perpendicular to the central axis but also directions pointing in so nearly the same direction as any perpendicular to the central axis that the practicability of the present invention may not be impaired, that is, substantially radial directions.

FIG. 1 is a cross-sectional view of a motor according to a preferred embodiment of the present invention. Hereinafter, a spindle motor 1 will be referred to simply as a motor 1. The motor 1 is preferably used, for example, in a hard disk drive apparatus, an optical disk drive apparatus, or the like. In other words, at least one disk (not shown) is caused by the motor 1 to rotate about a central axis J1. The motor 1 preferably includes a stationary portion 2, a rotating portion 3, and a fluid dynamic bearing 4. Hereinafter, the fluid dynamic bearing 4 will be referred to simply as the bearing 4. The rotating portion 3 is configured to rotate about the central axis J1 with respect to the stationary portion 2. The bearing 4 is configured to rotatably support the rotating portion 3.

The bearing 4 preferably includes a stationary bearing portion 41, a rotatable bearing portion 42, a seal portion 43, a lubricating fluid 44, and a liquid surface 45 of the lubricating fluid 44. The stationary bearing portion 41 is fixed to the stationary portion 2. The rotatable bearing portion 42 is configured to rotate together with the rotating portion 3. The seal portion 43 is located between a wall surface of the stationary bearing portion 41 and a wall surface of the rotatable bearing portion 42. The lubricating fluid 44 is positioned to intervene between the stationary bearing portion 41 and the rotatable bearing portion 42. The liquid surface 45 is located in the seal portion 43. The details of the bearing 4 will be described below.

The rotating portion 3 preferably includes a rotor magnet 31 and a rotor hub 32. The rotor hub 32 includes a circular or substantially circular plate portion 321, a raised portion 322, and a cylindrical or substantially cylindrical portion 323. In other words, the rotating portion 3 includes the circular or substantially circular plate portion 321, the raised portion 322, and the cylindrical or substantially cylindrical portion 323.

The rotor hub 32 is preferably a cup-shaped or substantially cup-shaped member. The circular or substantially circular plate portion 321 is preferably a disk-shaped or substantially disk-shaped member including a through hole passing therethrough in an axial direction. In other words, the circular or substantially circular plate portion 321 is annular or substantially annular, extending around the central axis J1. An upper portion of a shaft 421 described below is fixed in the through hole of the circular plate portion 321 preferably through, for example, crimping, adhesion, or the like. The cylindrical or substantially cylindrical portion 323 is cylindrical or substantially cylindrical, and is configured to extend axially downward from an outer edge portion of the circular or substantially circular plate portion 321.

The raised portion 322 is configured to extend axially downward from a lower surface of the circular or substantially circular plate portion 321. In this preferred embodiment, the raised portion 322 is cylindrical or substantially cylindrical.

The rotor magnet 31 is arranged on the rotor hub 32. In this preferred embodiment, the rotor magnet 31 is preferably cylindrical or substantially cylindrical. Note that the rotor magnet 31 may be defined by a plurality of magnets arranged in a circumferential direction. The rotor magnet 31 is preferably, for example, fixed to an inner circumferential surface of the cylindrical portion 323 through an adhesive, press fitting, or the like. Note, however, that the rotor magnet 31 may be fixed to the cylindrical portion 323 by any other desirable method.

Further, a back iron may be located between the rotor magnet 31 and the inner circumferential surface of the cylindrical portion 323. In this case, the back iron is preferably cylindrical, and the rotor magnet 31 is arranged on an inner circumferential surface of the back iron. The back iron is preferably made of a magnetic material such as, for example, iron, steel, etc.

In FIG. 1, the rotor magnet 31 is arranged inside the inner circumferential surface of the cylindrical portion 323 of the rotor hub 32. In FIG. 1, the motor 1 is of a so-called outer-rotor type. Note, however, that the rotor magnet 31 may be arranged outside an outer circumferential surface of the cylindrical portion of the rotor hub 32. That is, the motor 1 may be of an inner-rotor type.

In addition, the rotor hub 22 preferably includes a flange 324 at a lower portion of the cylindrical portion 323. The flange 324 is configured to extend radially outward from the outer circumferential surface of the cylindrical portion 323. When the disk drive apparatus is assembled, at least one disk (not shown) is mounted on an upper surface of the flange 324. An inner circumferential surface of a through hole of the disk is positioned radially opposite the outer circumferential surface of the cylindrical portion 323. As a result, the disk is caused to rotate once the rotating portion 2 starts rotating.

The stationary portion 2 preferably includes a stator 21, a base portion 22, and a recessed portion 23. The stator 21 is arranged opposite to the rotor magnet 31 with a gap intervening therebetween. The base portion 22 is a plate-shaped or substantially plate-shaped member. The base portion 22 is configured to extend radially outward away from the central axis J1. The stator 21 is fixed to the base portion 21. In FIG. 1, the recessed portion 23 is defined by an inside surface of the stator 21, an outside surface of a sleeve 411 described below, and a stator holding portion 223 described below. The recessed portion is preferably annular or substantially annular, and is configured to accommodate the raised portion 322.

The base portion 22 preferably includes a bearing holding portion 221, a flat plate portion 222, the stator holding portion 223, and at least one through hole 224. The bearing holding portion 221 is cylindrical or substantially cylindrical. The bearing 4 is arranged inside the bearing holding portion 221. An inner circumferential surface of the bearing holding portion 221 is positioned radially opposite an outer circumferential surface of the bearing 4. The flat plate portion 222 is configured to extend radially outward from a lower portion of the bearing holding portion 221. Each through hole 224 is configured to pass through the flat plate portion 222 in the axial direction. The stator holding portion 223 is cylindrical. An inner circumferential surface of the stator 21 is positioned radially outside the stator holding portion 223. An outer circumferential surface of the stator holding portion 223 is positioned radially opposite the inner circumferential surface of the stator 21. The stator 21 is fixed to the stator holding portion 223 through, for example, press fit, adhesion, or the like.

The bearing 4 is preferably fixed to the bearing holding portion 221 through, for example, insertion, press fitting, or the like. The bearing 4 may be fixed to the bearing holding portion 221 by another method, and may be fixed thereto through, for example, an adhesive. In this case, the adhesive may be located between the bearing 4 (an outer circumferential surface of the sleeve 411 described below) and the inner circumferential surface of the bearing holding portion 221. Meanwhile, the stator 21 is preferably fixed to the stator holding portion 223 through, for example, insertion, press fitting, or the like. Alternatively, if so desired, the stator 21 may be fixed to the stator holding portion 223 through an adhesive, and no particular limitation is imposed on the method. In the case where the adhesive is used, the adhesive may be located between the inner circumferential surface of the stator 21 and the outer circumferential surface of the stator holding portion 223.

The stator 21 includes a stator core 211 and a plurality of coils 212. The stator core 211 is preferably defined, for example, by laminated steel sheets. The laminated steel sheets preferably are a plurality of electromagnetic steel sheets (preferably, for example, silicon steel sheets) placed one upon another in the axial direction. The electromagnetic steel sheets placed one upon another are fixed to one another through, for example, crimping, welding, or the like. The stator core 211 includes a plurality of teeth 2122 and a core back 2112. The core back 2112 is annular or substantially annular. The plurality of teeth 2122 are configured to extend radially outward from an outer circumferential surface of the core back 2112. The teeth 2122 are preferably arranged at regular intervals in the circumferential direction on the outer circumferential surface of the core back 2112.

The coils 212 are preferably defined by at least one conducting wire 2121 wound around the teeth 2122. In this preferred embodiment, the motor 1 is preferably a three-phase motor, for example. Therefore, the plurality of coils 212 are defined by at least three conducting wires 2121. The conducting wires 2121 are configured to supply three phase currents. An end portion of each of the conducting wires 2121 is drawn out downwardly of a lower surface of the flat plate portion 222 from above an upper surface of the flat plate portion 222 through a corresponding one of the through hole(s) 224. A circuit board 24 is arranged on the lower surface of the flat plate portion 222. Below the lower surface of the flat plate portion 222, the end portion of each conducting wire 2121 is electrically connected to the circuit board 24. Note that the wording "to be electrically connected" means, for example, to be in electrical continuity. The conducting wires 2121 include a common wire and the three conducting wires used to supply the aforementioned three phase currents. The end portion of each conducting wire 2121 is connected to the circuit board 24 through, for example, soldering or the like.

In the above-described preferred embodiment, a flexible printed circuit board, for example, is preferably used as the circuit board 24. This is because a flexible printed circuit board has a smaller axial thickness than that of other types of boards. This reduces an increase in the axial dimension of the motor 1.

An insulating member 225 is preferably arranged in each through hole 224. In this preferred embodiment, the insulating member 225 is a cylindrical or substantially cylindrical member. In each through hole 224, a corresponding one of the conducting wires 2121 is radially opposed to an inner circumferential surface defining the through hole 224 with the insulating member 225 intervening therebetween. Examples of the insulating member 225 include an insulation sheet or an insulating bushing preferably made of an insulating material, a non-conductive adhesive, and so on. The insulating member 225 is configured to prevent a contact between the base portion 22 and each conducting wire 2121. Each conducting wire 2121 is thereby prevented from being short-circuited when the motor 1 is energized.

Next, the details of the bearing 4 will now be described below. As mentioned above, the bearing 4 includes the seal portion 43. The seal portion 43 is defined between the wall surface of the stationary bearing portion 41 and the wall surface of the rotatable bearing portion 42. In more detail, the seal portion 43 is a portion at which at least one of the wall surface of the stationary bearing portion 41 and the wall surface of the rotatable bearing portion 42 becomes progressively more distant from the other with increasing height, between the wall surface of the stationary bearing portion 41 and the wall surface of the rotatable bearing portion 42. In this preferred embodiment, in an upper portion of the bearing 4, the radial distance between the central axis J1 and the wall surface of the stationary bearing portion 41 (an inner circumferential surface of the sleeve 411 described below) is configured to gradually increase with increasing height. The liquid surface 45 of the lubricating fluid 44 is located in the seal portion 43.

In the preferred embodiment illustrated in FIG. 1, the stationary bearing portion 41 preferably includes the sleeve 411 and a cap 412. The rotatable bearing portion 42 preferably includes the shaft 421 and a thrust plate 422. The motor 1 illustrated in FIG. 1 is a so-called rotating-shaft motor. The thrust plate 422 is a portion configured to extend radially outward from a lower portion of the shaft 421. According to the preferred embodiment illustrated in FIG. 1, the shaft 421 and the thrust plate 422 are preferably defined as a single monolithic and continuous member. Note, however, that the shaft 421 and the thrust plate 422 may alternatively be defined by separate members, if so desired.

The sleeve 411 is cylindrical or substantially cylindrical, and includes a hole 4111. The hole 4111 is configured to pass through the sleeve 411 in the axial direction. The shaft 421 is configured to pass through the hole 4111. The cap 412 is arranged at an axially lower opening of the sleeve 411. In other words, the axially lower opening of the sleeve 411 is covered with the cap 412. The cap 412 is arranged axially opposite a lower surface of the thrust plate 422. In addition, a tubular portion extending axially upward is arranged at a radially outer end portion of the cap 412. An inside surface of the tubular portion is positioned radially opposite an outside surface of the thrust plate 422. The tubular portion is arranged axially opposite a lower surface of the sleeve 411.

In addition, the lubricating fluid 44 is positioned to intervene between the stationary bearing portion 41 and the rotatable bearing portion 42. In the preferred embodiment illustrated in FIG. 1, the lubricating fluid 44 is preferably positioned to intervene between an outer circumferential surface of the shaft 421 and the inner circumferential surface of the sleeve 411, between an upper surface of the thrust plate 422 and the lower surface of the sleeve 411, and between the lower surface of the thrust plate 422 and an upper surface of the cap 412.

Furthermore, the seal portion 43 is located between a wall surface of the sleeve 411 and a wall surface of the shaft 421. In more detail, the seal portion 43 is located between the inner circumferential surface of the sleeve 411 and the outer circumferential surface of the shaft 421. Note that, in FIG. 1, the seal portion 43 refers to a portion at which the inner circumferential surface of the sleeve 411 becomes progressively more distant from the outer circumferential surface of the shaft 421 with increasing height in an upper portion of a gap defined by the inner circumferential surface of the sleeve 411 and the outer circumferential surface of the shaft 421. The liquid surface 45 of the lubricating fluid 44 is located in the seal portion 43.

As illustrated in FIG. 1, the raised portion 322 is accommodated in the recessed portion 23. More specifically, the recessed portion 23 is preferably defined at least in part by a first side surface 231 and a second side surface 232. In FIG. 1, the first side surface 231 is an outer circumferential surface of an upper portion of the sleeve 411. The second side surface 232 is an inner circumferential surface of the stator core 211. A first minute gap d1 is a gap between an inner circumferential surface 3221 of the raised portion 322 and the first side surface 231 of the recessed portion 23. A second minute gap d2 is a gap between an outer circumferential surface 3222 of the raised portion 322 and the second side surface 232 of the recessed portion 23. That is, the inner circumferential surface 3221 of the raised portion 322 is positioned radially opposite the first side surface 231 of the recessed portion 23 with the first minute gap d1 intervening therebetween. Meanwhile, the outer circumferential surface 3222 of the raised portion 322 is positioned radially opposite the second side surface 232 of the recessed portion 23 with the second minute gap d2 intervening therebetween. The first minute gap d1 is configured to be in communication with the seal portion 43. The second minute gap d2 is configured to be in communication with the first minute gap d1.

Each of the first minute gap d1 and the second minute gap d2 is configured to have a small radial width and a large path length. In FIG. 1, in more detail, the first minute gap d1 is configured to have a radial width smaller than that of the second minute gap d2. The radial width of the first minute gap d1 is configured to be smaller than a maximum radial width of the seal portion 43. The radial width of the second minute gap d2 is configured to be smaller than the maximum radial width of the seal portion 43. In addition, an axial dimension 11 of the first minute gap d1 is configured to be greater than an axial dimension 12 of the second minute gap d2.

Accordingly, the provision of the first minute gap d1 and the second minute gap d2 contributes to reducing the likelihood that a gas including the lubricating fluid 44 evaporated from the liquid surface 45 will travel out of the motor 1 through the first minute gap d1 and the second minute gap d2. As a result, a space (hereinafter referred to as a space "S") extending from the seal portion 43 to the first minute gap d1 is filled with the gas (hereinafter referred to as a gas "G") including the evaporated lubricating fluid 44, and approaches saturation. This contributes to reducing evaporation of the lubricating fluid 44 from the liquid surface 45. This in turn contributes to reducing a decrease in the amount of the lubricating fluid 44 in the bearing 4 due to the evaporation of the lubricating fluid 44.

In addition, the greater the axial dimensions of the first and second minute gaps d1 and d2 are, the longer time it takes the gas G to pass through the first and second minute gaps d1 and d2, respectively. As a result, before the gas G passes through each minute gap, the space S tends to easily reach the saturation, and the evaporated lubricating fluid 44 condenses, for example. That is, the likelihood that the gas G will travel out of the motor 1 is reduced. As a result, the gas G tends to more easily stay in the space S, and a time required for the space S to approach the saturation is shortened. In order to obtain the above effect, it is preferable that each of the first and second minute gaps d1 and d2 have an axial dimension greater than an axial dimension of the seal portion 43. It is particularly preferable that the axial dimension 11 of the first minute gap d1 should be greater than an axial dimension 13 of the seal portion 43.

Further, it is preferable that the axial dimensions of the first and second minute gaps d1 and d2 should be configured to be equal to or greater than five times the radial widths of the first and second minute gaps d1 and d2, respectively. This arrangement further reduces the likelihood that the gas G will travel out of the motor 1. It is particularly preferable that the axial dimension 11 of the first minute gap d1 should be configured to be equal to or greater than five times the radial width of the first minute gap d1.

As mentioned above, in the preferred embodiment illustrated in FIG. 1, the first side surface 231 is the outer circumferential surface of the upper portion of the sleeve 411. This arrangement enables the first minute gap d1 to be arranged more radially inward than in the case where the first side surface 231 is an outer circumferential surface of the bearing holding portion 221. Accordingly, the space extending from the seal portion 43 to the first minute gap d1 is reduced in size. As a result, the space comes to be filled with the gas including the evaporated lubricating fluid 44, and the time required for the space to approach the saturation is shortened. Accordingly, evaporation of the lubricating fluid 44 in the seal portion 43 is further reduced.

In addition, as mentioned above, in the preferred embodiment illustrated in FIG. 1, the second side surface 232 is the inner circumferential surface of the stator core 211. This arrangement enables the inner circumferential surface of the stator core 211 to be arranged more radially inward than in the case where the second side surface 232 is an inner circumferential surface of the stator holding portion 223. This contributes to reducing the radial width of the second minute gap d2, and to further reducing the evaporation of the lubricating fluid 44. Moreover, since the inner circumferential surface of the stator core 211 is arranged more radially inward, it is possible to expand the stator core 211 radially inward. That is, it is possible to increase the radial width of the core back 2112, to increase the radial length of each of the teeth 2122, and so on. It is therefore possible to reduce magnetic saturation, and to increase the number of turns of the conducting wire 2121. This makes it possible to increase an output of the motor.

In addition, according to the preferred embodiment illustrated in FIG. 1, the rotating portion 3 preferably further includes a stationary bearing portion opposing portion 325 arranged axially opposite the stationary bearing portion 411. An axial distance D1 between an upper surface 413 of the stationary bearing portion 411 and a lower surface 3251 of the stationary bearing portion opposing portion 325 is configured to be shorter than an axial distance D2 between a bottom surface 233 of the recessed portion 23 and a lower surface 3223 of the raised portion 322. This arrangement causes a gap positioned radially inward to have a smaller axial width, and accordingly reduces the likelihood that the gas G will travel out of the motor 1.

Figure 2:
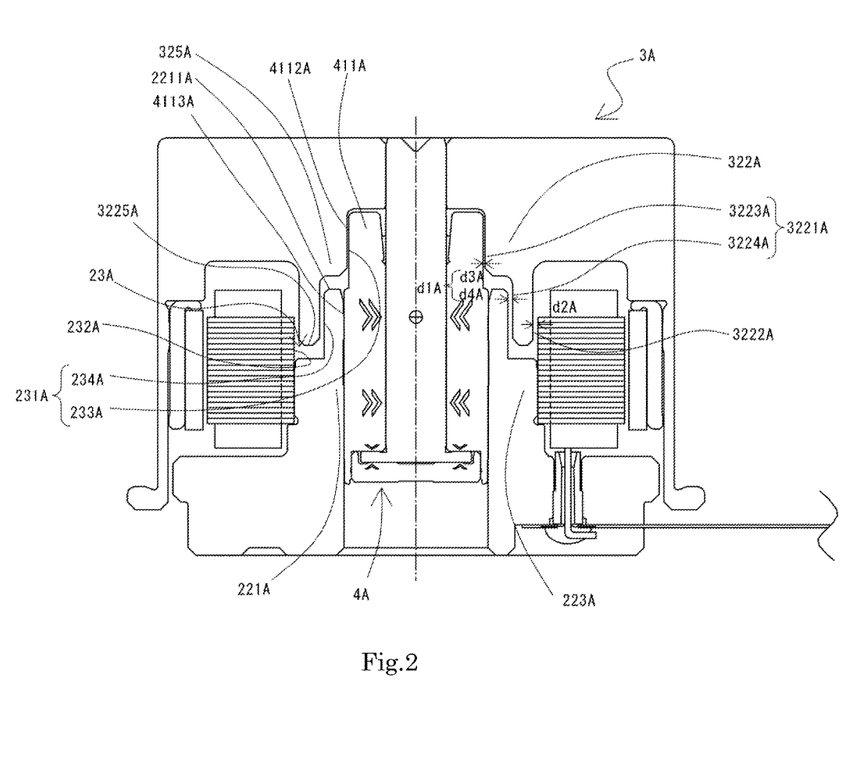
FIG. 2 is a cross-sectional view of a motor according to an example modification of the above preferred embodiment of the present invention.

Next, an example modification of the preferred embodiment of the present invention will now be described below. FIG. 2 is a cross-sectional view of a motor according to an example modification of the preferred embodiment of the present invention. Note that, in the following description, descriptions of features similar to those of the preferred embodiment illustrated in FIG. 1 will be omitted.

According to the example modification of a preferred embodiment of the present invention illustrated in FIG. 2, a first side surface 231A preferably includes a third side surface 233A and a fourth side surface 234A. As in the example modification illustrated in FIG. 2, a first minute gap d1A may be defined by a third minute gap d3A and a fourth minute gap d4A. The fourth side surface 234A is an outer circumferential surface of a bearing holding portion 221A. A second side surface 232A is an inside surface of a stator core 211A. A recessed portion 23A is defined by the fourth side surface 234A, the second side surface 232A, and a stator holding portion 223A.

An outer circumferential surface of a sleeve 411A includes an upper outer circumferential surface 4112A and a lower outer circumferential surface 4113A. The upper outer circumferential surface 4112A is a portion of the outer circumferential surface of the sleeve 411A which is positioned axially above the lower outer circumferential surface 4113A. The lower outer circumferential surface 4113A is positioned radially outward of the upper outer circumferential surface 4112A. In other words, an outside diameter of a portion of the sleeve 411 which includes the upper outer circumferential surface 4112A is preferably configured to be smaller than an outside diameter of a portion of the sleeve 411 which includes the lower outer circumferential surface 4113A.

Further, an inner circumferential surface 3221A of a raised portion 322A preferably includes an upper inner circumferential surface 3223A and a lower inner circumferential surface 3224A. The upper inner circumferential surface 3223A is positioned axially above the lower inner circumferential surface 3224A. The upper inner circumferential surface 3223A is positioned radially inward of the lower inner circumferential surface 3224A. The raised portion 322A preferably includes a shoulder configured to join the upper inner circumferential surface 3223A and the lower inner circumferential surface 3224 to each other.

The third minute gap d3A is a gap between the upper inner circumferential surface 3223A and the upper outer circumferential surface 4112A. That is, the upper inner circumferential surface 3223A of the raised portion 322A is positioned radially opposite the upper outer circumferential surface 4112A with the third minute gap d3A intervening therebetween.

The fourth minute gap d4A is a gap between the lower inner circumferential surface 3224A and the fourth side surface 234A. That is, the lower inner circumferential surface 3224A of the raised portion 322A is positioned radially opposite the fourth side surface 234A of the recessed portion 23A with the fourth minute gap d4A intervening therebetween. A second minute gap d2A is a gap between an outer circumferential surface 3222A of the raised portion 322A and the second side surface 232A. That is, the outer circumferential surface 3222A of the raised portion 322A is positioned radially opposite the second side surface 232A of the recessed portion 23A with the second minute gap d2A intervening therebetween.

As mentioned above, the upper inner circumferential surface 3223A is positioned radially inward of the lower inner circumferential surface 3224A. Accordingly, the third minute gap d3A is positioned radially inward of the fourth minute gap d4A. In addition, the third minute gap d3A is positioned radially inward of the second minute gap d2A. The second minute gap d2A is positioned radially outward of the fourth minute gap d4A. This leads to an additional reduction in evaporation of a lubricating fluid 44A in a seal portion 43.

In addition, the radial width of the fourth minute gap d4A is configured to be smaller than the radial width of the second minute gap d2A. The radial width of the third minute gap d3A is configured to be smaller than the radial width of the fourth minute gap d4A. The radial width of the third minute gap d3A is configured to be smaller than that of the second minute gap d2A. By arranging the minute gap positioned radially inward to be narrower than the minute gap positioned radially outward as described above, an additional reduction in the evaporation of the lubricating fluid 44A in the seal portion 43 is achieved. Moreover, this makes it possible to fit a stationary portion 2A and a rotating portion 3A to each other with high precision.

Moreover, in the example modification illustrated in FIG. 2, an uppermost end portion of the bearing holding portion 221A is positioned at a level higher than a level of a lower portion of the raised portion 322A. An inner circumferential surface of the bearing holding portion 221A is configured to extend axially upward above an axial position of a lowermost surface 3225A of the raised portion 322A. As mentioned above, in the example modification illustrated in FIG. 2, the fourth side surface 234A is the outer circumferential surface of the bearing holding portion 221A. This arrangement increases an area of contact of the inner circumferential surface of the bearing holding portion 221A with a bearing 4A (that is, the outer circumferential surface of the sleeve 411A). As a result, the bearing 4A is more securely fixed to the bearing holding portion 221A.

Figure 3:
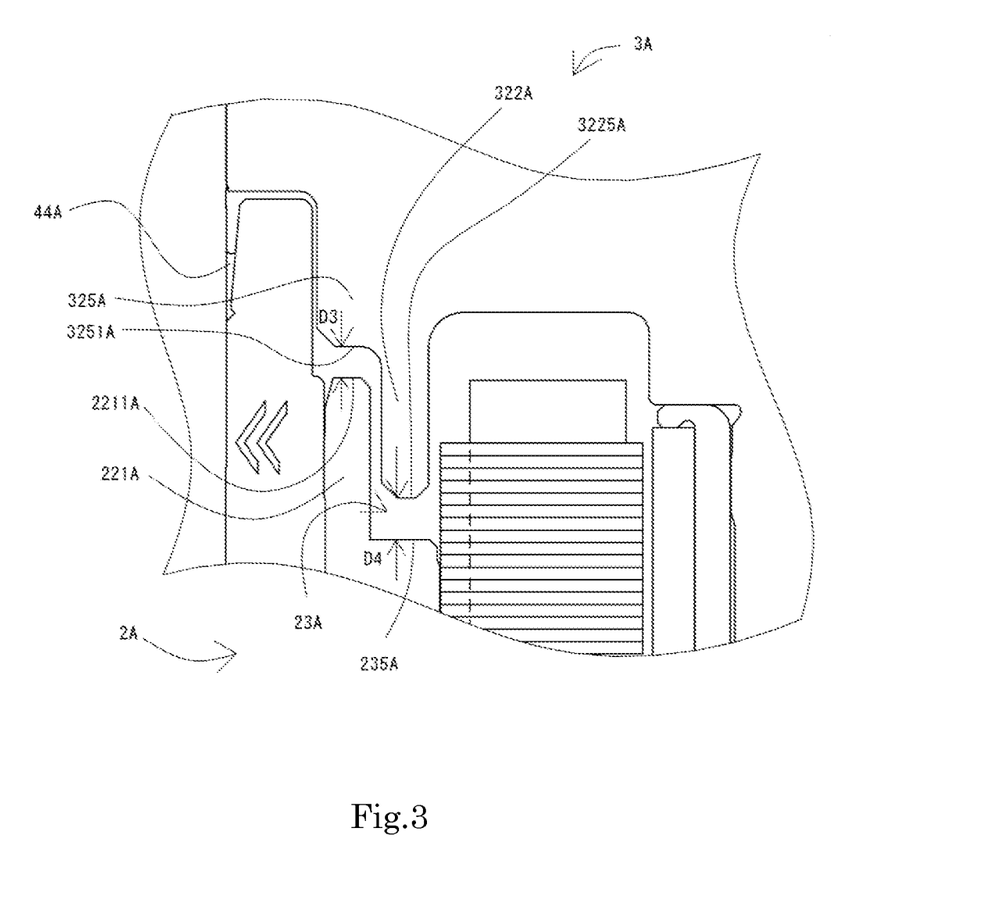
FIG. 3 is a partial cross-sectional view of the motor according to the example modification of the above preferred embodiment of the present invention.

FIG. 3 is a diagram illustrating a portion of FIG. 2 in an enlarged form. In FIG. 3, the rotating portion 3A includes a bearing holding portion opposing portion 325A arranged axially opposite the bearing holding portion 221A. An axial distance D3 between an upper surface 2211A of the bearing holding portion 221A and a lower surface 3251A of the bearing holding portion opposing portion 325A is configured to be shorter than an axial distance D4 between a bottom surface 235A of the recessed portion 23A and a lower surface 3225A of the raised portion 322A. This arrangement causes a gap positioned radially inward to have a smaller axial width, and accordingly reduces the likelihood that the gas G will travel out of the motor 1.

Figure 4:
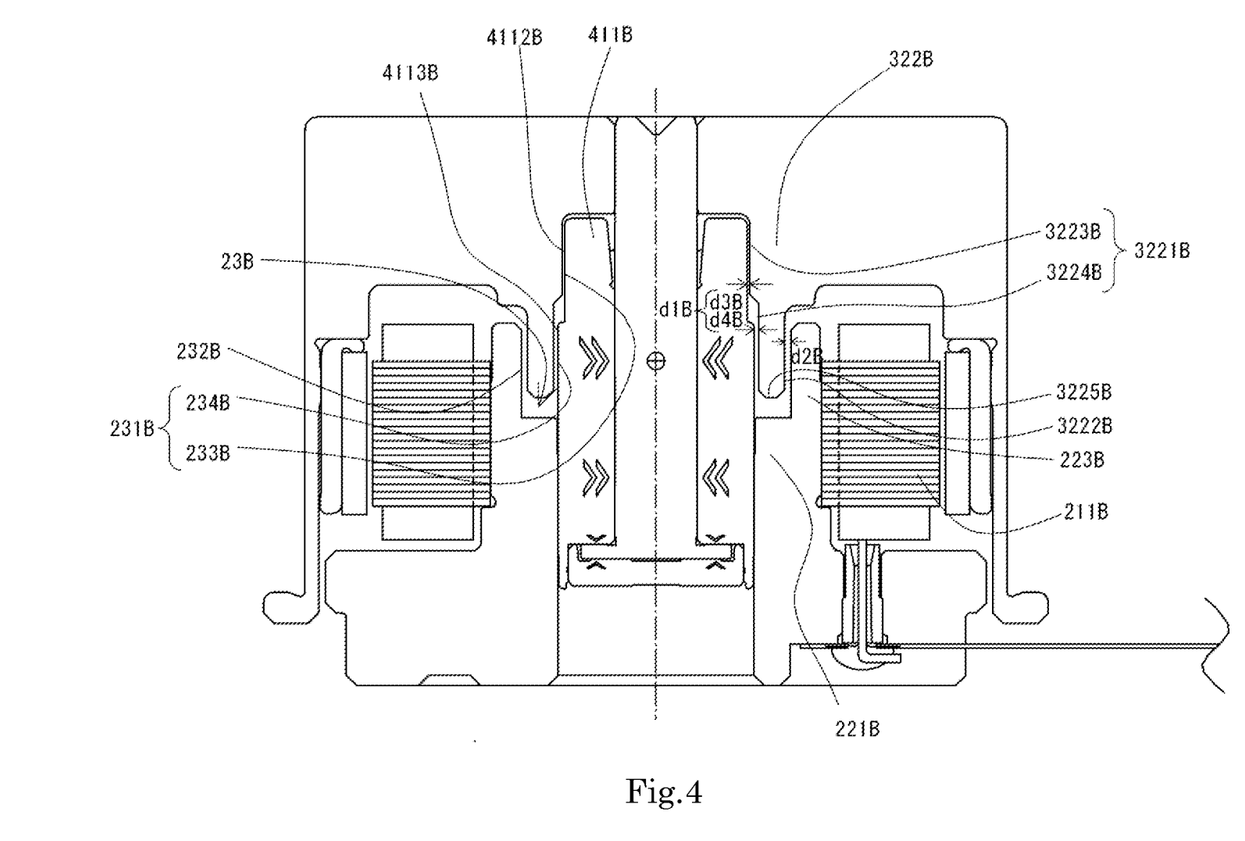
FIG. 4 is a cross-sectional view of a motor according to an example modification of the above preferred embodiment of the present invention.

Further, another example modification of a preferred embodiment of the present invention will now be described below. FIG. 4 is a cross-sectional view of a motor according to an example modification of a preferred embodiment of the present invention. Also in the example modification illustrated in FIG. 4, a sleeve 411B preferably includes an upper outer circumferential surface 4112B and a lower outer circumferential surface 4113B. In an outer circumferential surface of the sleeve 411B, the upper outer circumferential surface 4112B is positioned axially above the lower outer circumferential surface 4113B. The upper outer circumferential surface 4112B is preferably positioned radially inward of the lower outer circumferential surface 4113B. Further, an inner circumferential surface 3221B of a raised portion 322B includes an upper inner circumferential surface 3223B and a lower inner circumferential surface 3224B. The upper inner circumferential surface 3223B is arranged axially above the lower inner circumferential surface 3224B. The upper inner circumferential surface 3223B is positioned radially inward of the lower inner circumferential surface 3224B.

In FIG. 4, a fourth side surface 234B is an outer circumferential surface of an upper portion of the sleeve 411B. A second side surface 232B is an inner circumferential surface of a stator holding portion 223B. A recessed portion 23B is preferably defined by a first side surface 231B, the second side surface 232B, and a bearing holding portion 221B.

As illustrated in FIG. 4, a third minute gap d3B is a gap between the upper inner circumferential surface 3223B of the raised portion 322B and the upper outer circumferential surface 4112B. That is, the upper inner circumferential surface 3223B of the raised portion 322B is positioned radially opposite the upper outer circumferential surface 4112B with the third minute gap d3B intervening therebetween.

A fourth minute gap d4B is a gap between the lower inner circumferential surface 3224B of the raised portion 322B and the fourth side surface 234B of the recessed portion 23B. That is, the lower inner circumferential surface 3224B of the raised portion 322B is positioned radially opposite the fourth side surface 234B of the recessed portion 23B with the fourth minute gap d4B intervening therebetween.

A second minute gap d2B is a gap between an outer circumferential surface of the raised portion 322B and the second side surface 232B of the recessed portion 23B. That is, the outer circumferential surface of the raised portion 322B is positioned radially opposite the second side surface 232B of the recessed portion 23B with the second minute gap d2B intervening therebetween.

Also in the example modification illustrated in FIG. 4, the first side surface 231B preferably includes a third side surface 233B and the fourth side surface 234B. As in the example modification illustrated in FIG. 4, a first minute gap d1B may be defined by the third minute gap d3B and the fourth minute gap d4B. In addition, the third minute gap d3B is preferably positioned radially inward of the fourth minute gap d4B. The third minute gap d3B is positioned radially inward of the second minute gap d2B. The fourth minute gap d4B is positioned radially inward of the second minute gap d2B.

In addition, in FIG. 4, a stationary portion 2B includes the stator holding portion 223B. The stator holding portion 223B is cylindrical or substantially cylindrical. The stator holding portion 223B is configured to extend axially upward from an upper portion of the bearing holding portion 221B. An upper end portion of the stator holding portion 223B is positioned at a level higher than a level of a lowermost surface 3225B of the raised portion 322B. The raised portion 322B is positioned radially inside the stator holding portion 223B. An inner circumferential surface of the stator holding portion 223B is preferably positioned radially opposite the outer circumferential surface 3222B of the raised portion 322B. The lowermost surface 3225B is arranged axially opposite the bearing holding portion 221B. As mentioned above, in FIG. 4, the second side surface 232B is the inner circumferential surface of the stator holding portion 223B. This arrangement increases an area of contact of an outer circumferential surface of the stator holding portion 223B with an inner circumferential surface of the stator 211B. As a result, the stator 211B is more securely fixed to the stator holding portion 223B.

Figure 5:
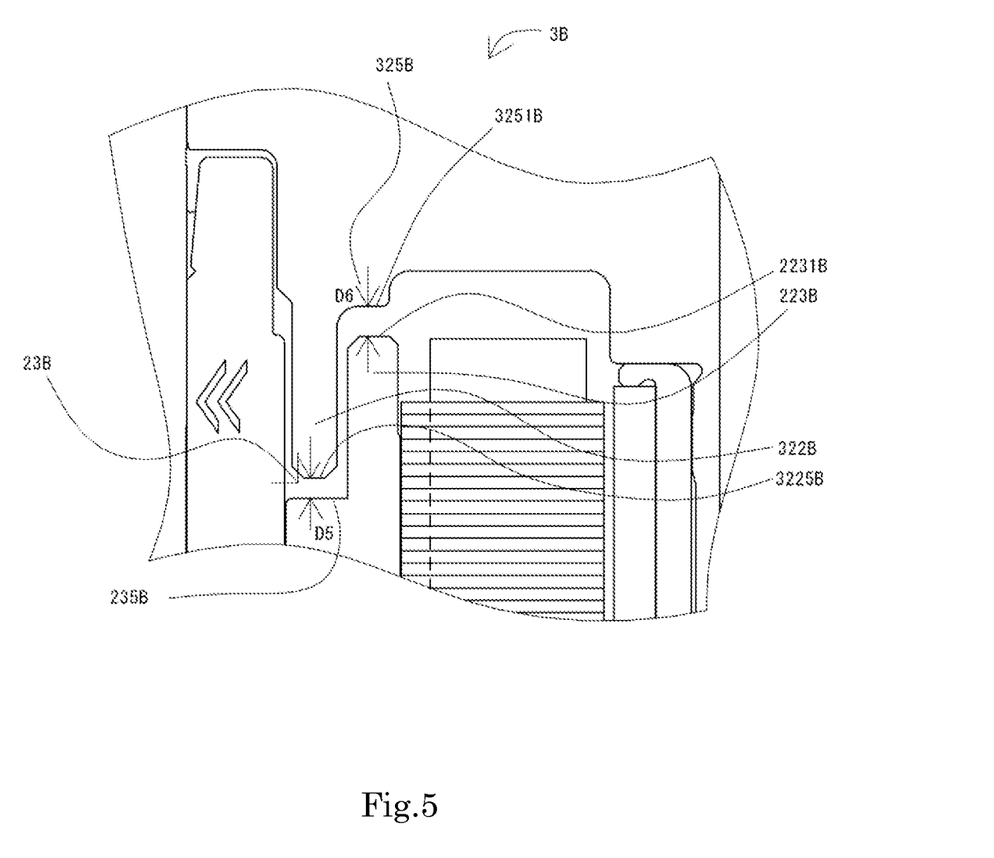
FIG. 5 is a partial cross-sectional view of the motor according to the example modification of the above preferred embodiment of the present invention.

FIG. 5 is a diagram illustrating a portion of FIG. 4 in an enlarged form. In FIG. 5, a rotating portion 3B includes a stator holding portion opposing portion 325B arranged axially opposite the stator holding portion 223B. An axial distance D5 between a bottom surface 235B of the recessed portion 23B and a lower surface 3225B of the raised portion 322B is preferably configured to be shorter than an axial distance D6 between an upper surface 2231B of the stator holding portion 223B and a lower surface 3251B of the stator holding portion opposing portion 325B. This arrangement causes a gap positioned radially inward to have a smaller axial width, and accordingly reduces the likelihood that the gas G will travel out of the motor 1.

Figure 6:
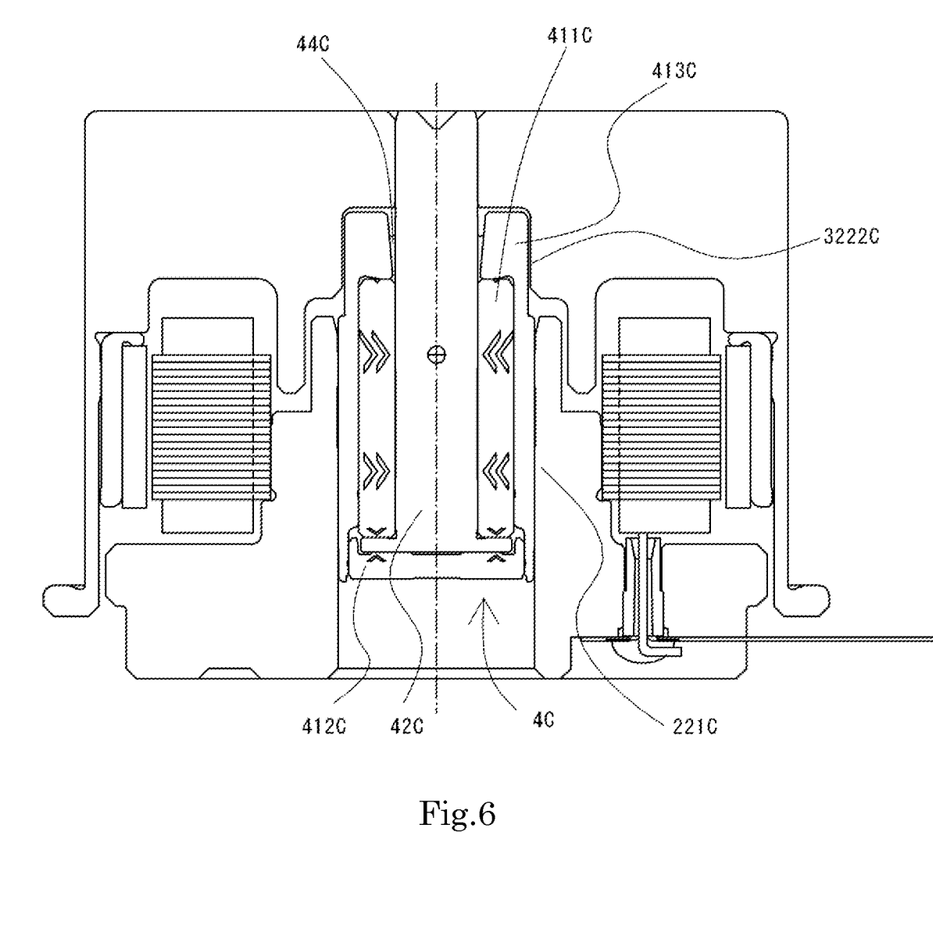
FIG. 6 is a cross-sectional view of a motor according to an example modification of the above preferred embodiment of the present invention.

Note that the shape of the bearing 4 is not limited to that described above. For example, FIG. 6 is a cross-sectional view of a motor according to an example modification of a preferred embodiment of the present invention. As illustrated in FIG. 6, a bearing 4C may be defined by a shaft 42C, a sleeve 411C, a sleeve housing 413C, a cap 412C, and a lubricating fluid 44C.

The sleeve housing 413C is a cylindrical or substantially cylindrical member. The sleeve housing 413C includes a tubular portion and an upper plate portion. The tubular portion of the sleeve housing 413C is arranged in a bearing holding portion 221C. The tubular portion of the sleeve housing 413C is located between the bearing holding portion 221C and the sleeve 411C. The sleeve housing 413C is preferably fixed to the bearing holding portion 221C through, for example, press fitting, adhesion, or the like.

The upper plate portion is arranged on an upper portion of the tubular portion of the sleeve housing 413C. The upper plate portion includes a hole passing therethrough in the axial direction in a substantial center thereof. The shaft 42C is configured to pass through the hole of the upper plate portion. A lower surface of the upper plate portion is arranged axially opposite an upper surface of the sleeve 411C. An upper surface of the upper plate portion is arranged axially opposite a lower surface of a circular plate portion 321. An outside surface of the upper plate portion is positioned radially opposite an upper inner circumferential surface 3222C.

An inner circumferential surface of a lower end portion of the tubular portion is preferably positioned radially opposite an outside surface of the cap 412C. The cap 412C is fixed to the inner circumferential surface of the lower end portion of the tubular portion through, for example, an adhesive or the like.

Note that the detailed shape of any member may be different from the shape thereof as illustrated in the accompanying drawings of the present application. Also note that features of the above-described preferred embodiments and the example modifications thereof may be combined appropriately as long as no conflict arises.

For example, instead of the flexible printed circuit board, a rigid board or the like may alternatively be used as the circuit board 24.

For example, in a structure illustrated in each drawing of the present application, the shaft and the rotor hub preferably are defined by separate members. Note, however, that the shaft and the rotor hub may be defined by a single member.

Also, the motor illustrated in each accompanying drawing of the present application preferably is a so-called rotating-shaft motor. Note, however, that the present invention may be applied to a so-called fixed-shaft motor in which a shaft is not rotatable.

Motors according to preferred embodiments of the present invention and modifications thereof are applicable to a variety of disk drive apparatuses. For example, a motor according to a preferred embodiment of the present invention may be configured to rotate a magnetic disk, an optical disk, a color wheel, or the like.

Also, motors according to preferred embodiments of the present invention and modifications thereof are usable as motors for use in applications other than the disk drive apparatuses. For example, a motor according to a preferred embodiment of the present invention is usable as a motor configured to rotate an impeller of a fan or the like.

Also, motors according to preferred embodiments of the present invention and modifications thereof are applicable to a variety of electronics devices.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A spindle motor comprising:
a stationary portion;
a rotating portion configured to rotate about a central axis with respect to the stationary portion; and
a bearing configured to support the rotating portion; wherein
the bearing includes:
   a stationary bearing portion fixed to the stationary portion;
   a rotatable bearing portion configured to rotate together with the rotating portion;
   a seal portion located between a wall surface of the rotatable bearing portion and a wall surface of the stationary bearing portion;
   a lubricating fluid positioned to intervene between the rotatable bearing portion and the stationary bearing portion; and
   a liquid surface of the lubricating fluid located in the seal portion;
the rotating portion includes:
   a rotor magnet;
   a circular or substantially circular plate portion configured to extend around the central axis; and
   an annular or substantially annular raised portion configured to project downward from the circular or substantially circular plate portion;
the stationary portion includes:
   a stator arranged opposite to the rotor magnet with a gap intervening therebetween;
   a base portion configured to extend around the central axis, and configured to have the stator fixed thereto; and
   an annular or substantially annular recessed portion configured to accommodate the raised portion, and including a first side surface and a second side surface;
the raised portion includes:
   an inner circumferential surface positioned radially opposite the first side surface of the recessed portion with a first minute gap intervening therebetween; and
   an outer circumferential surface positioned radially opposite the second side surface of the recessed portion with a second minute gap intervening therebetween;
the first minute gap is configured to have an axial dimension greater than an axial dimension of the seal portion;
the rotatable bearing portion includes a shaft;
the stationary bearing portion includes a sleeve including a hole configured to accommodate the shaft;
an outer circumferential surface of the sleeve includes:
   an upper outer circumferential surface; and
   a lower outer circumferential surface configured to project radially outward relative to the upper outer circumferential surface;
the inner circumferential surface of the raised portion includes:
   an upper inner circumferential surface positioned radially opposite the upper outer circumferential surface with a third minute gap intervening therebetween; and
   a lower inner circumferential surface positioned radially opposite the lower outer circumferential surface with a fourth minute gap intervening therebetween; and
the third minute gap is positioned radially inward of the fourth minute gap.

2. The spindle motor according to claim 1, wherein the axial dimension of the first minute gap is equal to or greater than five times a radial width of the first minute gap.

3. The spindle motor according to claim 1, wherein the axial dimension of the first minute gap is greater than an axial dimension of the second minute gap.

4. The spindle motor according to claim 1, wherein
the rotating portion further includes a stationary bearing portion opposing portion arranged axially opposite the stationary bearing portion; and
an axial distance between an upper surface of the stationary bearing portion and a lower surface of the stationary bearing portion opposing portion is shorter than an axial distance between an upper surface of the recessed portion and a lower surface of the raised portion.

5. The spindle motor according to claim 1, wherein the first side surface is an outer circumferential surface of the bearing.

6. The spindle motor according to claim 1, wherein
the stationary portion further includes a bearing holding portion configured to hold the bearing; and
the first side surface of the recessed portion is an outer circumferential surface of the bearing holding portion.

7. The spindle motor according to claim 6, wherein
the rotating portion further includes a bearing holding portion opposing portion arranged axially opposite the bearing holding portion; and
an axial distance between an upper surface of the bearing holding portion and a lower surface of the bearing holding portion opposing portion is less than an axial distance between a bottom surface of the recessed portion and a lower surface of the raised portion.

8. The spindle motor according to claim 1, wherein
the rotating portion further includes a stator holding portion opposing portion arranged axially opposite the stator holding portion; and
an axial distance between a bottom surface of the recessed portion and a lower surface of the raised portion is less than an axial distance between an upper surface of the stator holding portion and a lower surface of a stator holding portion opposing portion.

9. An electronics device comprising the spindle motor of claim 1.

10. A disk drive apparatus comprising the spindle motor of claim 1.

11. The spindle motor according to claim 1, wherein the third minute gap has a radial width smaller than a radial width of the fourth minute gap.

12. The spindle motor according to claim 1, wherein
the stationary portion further includes a stator holding portion configured to hold the stator; and
the second side surface is an inner circumferential surface of the stator holding portion.

* * * * *